US008847517B2

(12) United States Patent
Sutardja et al.

(10) Patent No.: US 8,847,517 B2
(45) Date of Patent: Sep. 30, 2014

(54) TRIAC DIMMING SYSTEMS FOR SOLID-STATE LOADS

(75) Inventors: Sehat Sutardja, Los Altos Hills, CA (US); Pantas Sutardja, Los Gatos, CA (US); Wanfeng Zhang, Palo Alto, CA (US); Jinho Choi, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 138 days.

(21) Appl. No.: 13/525,711

(22) Filed: Jun. 18, 2012

(65) Prior Publication Data

US 2012/0319621 A1  Dec. 20, 2012

Related U.S. Application Data

(60) Provisional application No. 61/498,376, filed on Jun. 17, 2011.

(51) Int. Cl.
*H05B 37/02* (2006.01)
*H05B 33/08* (2006.01)

(52) U.S. Cl.
CPC .................................. *H05B 33/0815* (2013.01)
USPC ............................ 315/307; 315/224; 315/276

(58) Field of Classification Search
CPC .... H05B 33/0815; H05B 37/02; H05B 39/02; H05B 39/04; H05B 42/2822; H05B 41/2827
USPC ...... 315/209 R, 224, 274, 276, 291, 307, 308
See application file for complete search history.

(56) References Cited

U.S. PATENT DOCUMENTS

| 7,872,427 | B2 | 1/2011 | Scianna | |
|---|---|---|---|---|
| 8,593,069 | B2 * | 11/2013 | Kang et al. | 315/219 |
| 8,629,629 | B2 * | 1/2014 | Hariharan | 315/297 |
| 2008/0224629 | A1 * | 9/2008 | Melanson | 315/247 |
| 2008/0278092 | A1 * | 11/2008 | Lys et al. | 315/247 |
| 2011/0037399 | A1 * | 2/2011 | Hung et al. | 315/219 |
| 2011/0080118 | A1 | 4/2011 | Daniel | |

FOREIGN PATENT DOCUMENTS

WO  WO2011/114250  9/2011

OTHER PUBLICATIONS

Notification of Transmittal of The International Search Report and The Written Opinion of The International Searching Authority, or The Declaration dated Sep. 7, 2012 in reference to PCT/US2012/042944 (12 pgs).

* cited by examiner

*Primary Examiner* — Tung X Le (57) ABSTRACT

A system includes a transformer. The transformer includes a first coil and a second coil. The first coil is configured to receive a first voltage based on an output of a switching circuit. The second coil is configured to generate a first current based on the first voltage to power a solid-state load. The system also includes a third coil. The third coil is configured to generate a second voltage based on the first voltage.

21 Claims, 10 Drawing Sheets

TRIAC DIMMING SYSTEMS FOR SOLID-STATE LOADS

CROSS-REFERENCE TO RELATED APPLICATIONS

This application claims the benefit of U.S. Provisional Application No. 61/498,376, filed on Jun. 17, 2011. The disclosure of the above application is incorporated herein by reference in its entirety.

FIELD

The present disclosure relates to triode for alternating current (TRIAC) dimmers.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A dimmer for an incandescent lamp may include an input circuit with a thyristor. The thyristor switches ON at an adjustable time (or phase angle) subsequent to a start of each alternating current (AC) half-cycle of a power signal received from an AC power source. Switching ON and OFF the thyristor affects a voltage waveform received at the incandescent lamp. The input circuit controls current supplied to the incandescent lamp based on a control input. The control input may be changed to adjust a dimming level of the incandescent lamp.

A thyristor operates as a bistable switch conducting when a current trigger is received and continuing to conduct while in a forward biased state. Since the thyristor switches ON and OFF instead of absorbing a portion of the power supplied from the AC power source, the amount of wasted power due to the thyristor is minimal. This is unlike traditional variable resistors, which absorb (or convert) a portion of the AC power provided to thermal energy.

As an alternative to using a single thyristor, a dimmer may include a TRIAC. A TRIAC includes two thyristors, operates as a bidirectional switch, and has specific latching properties. In order to latch a TRIAC in an ON state, a trigger voltage is applied across terminals of the TRIAC. The trigger voltage is greater than a predetermined voltage level to enable a minimum current (or latch-up current) to flow through and latch the TRIAC in the ON state. The latch-up current may be, for example, several milli-amps (mA) to tens of mA. The latch-up current must flow for a certain period of time to completely latch the TRIAC in the ON state. Subsequent to latching the TRIAC, a predetermined level of current (or hold-up current) is supplied to maintain the TRIAC in the ON state. The hold-up current may be less than the latch-up current. Different TRIACs have different latch-up and hold-up current levels.

Solid-state lighting refers to providing light from solid-state lamps, such as light from light emitting diodes (LEDs). A solid-state lamp can provide the same level of luminous intensity as an incandescent lamp while consuming less power. As an example, a LED may consume 6 watts of power for a given luminous intensity, whereas an incandescent light may consume 60 watts of power for the same luminous intensity. The luminous intensity per power usage rating (e.g., luminance/watt rating) of solid-state lamps continues to increase with technology improvements in solid-state lamps. As a result, solid-state lamps can provide a high level of luminous intensity (at least the same as an incandescent lamp) while operating based on a low level of power and/or current (less than that used by an incandescent lamp).

Due to the low power operation and corresponding operating current levels of solid-state lamps, it can be difficult to maintain a hold-up current using traditional TRIAC dimmers. The smaller the current level, the more difficult it is to maintain a sustainable hold-up current. A traditional TRIAC dimmer may be configured for an incandescent lamp having a full power rating of, for example, 60 W. Since a solid-state lamp may have a full power rating of, for example, 6 W during deep dimming (or low luminous intensity output) conditions, operating power may be less than 1 W. As a result, the current through a TRIAC of a traditional dimmer may decrease to a level less than a hold-up current and the TRIAC may shut OFF. Thus, load applications and dimming performance is limited for traditional TRIAC dimmers.

SUMMARY

A system is provided and includes a transformer. The transformer includes a first coil and a second coil. The first coil is configured to receive a first voltage based on an output of a switching circuit. The second coil is configured to generate a first current based on the first voltage to power a solid-state load. The system also includes a third coil. The third coil is configured to generate a second voltage based on the first voltage.

In other features, the system further includes a first module configured to generate a first control signal to change a state of the first switch based on the dimming level of the system.

In yet other features, a method is provided. The method includes receiving a first voltage at a first coil of a transformer based on an output of a switching circuit. A first current is generated via a second coil based on the first voltage to power a solid-state load. A second voltage is generated via a third coil based on the first voltage. Current is bled from one of the second coil and the third coil to a ground reference via a first switch based on a dimming level.

In still other features, the method further includes generating a first control signal to change a state of the first switch based on the dimming level.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
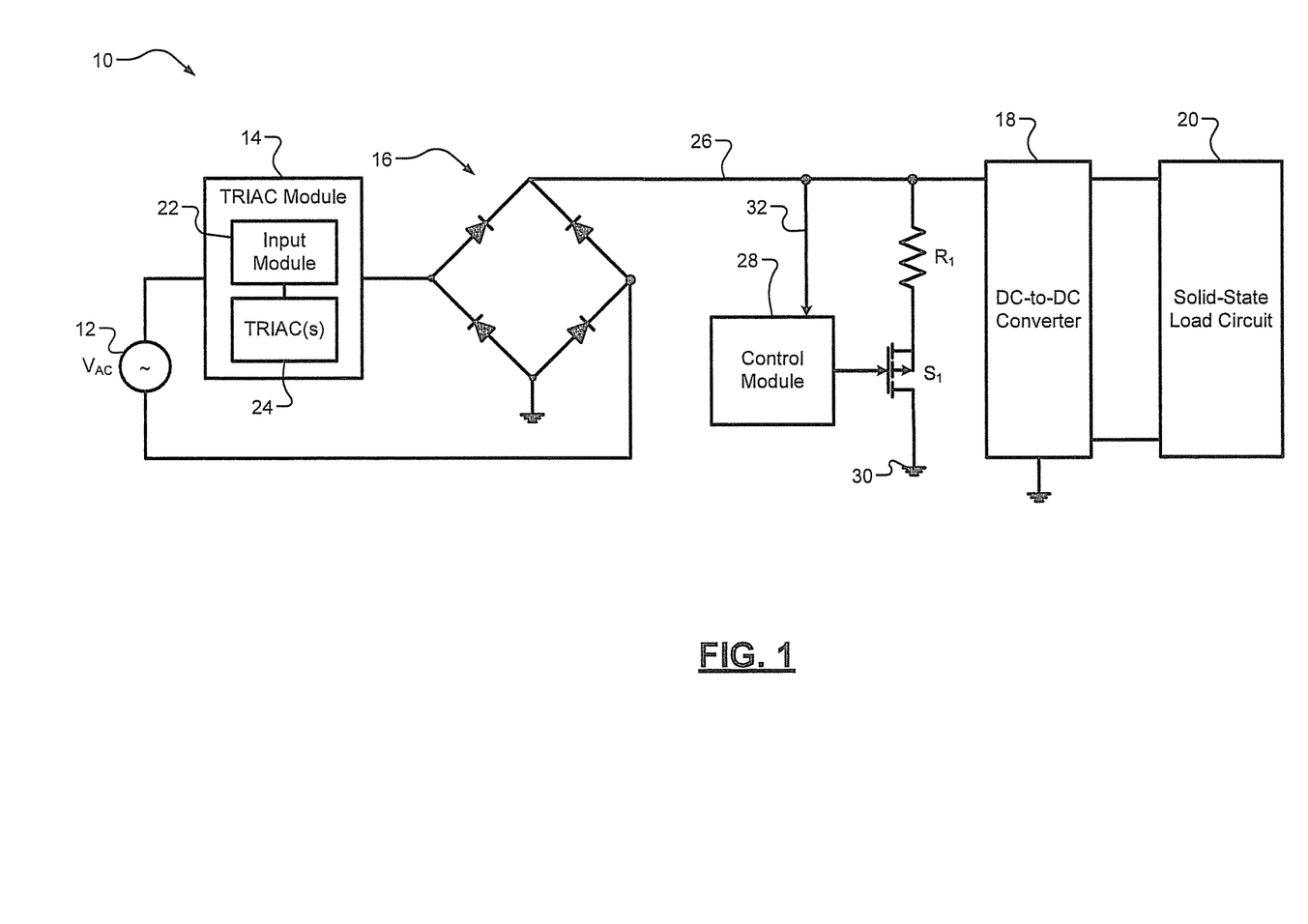
FIG. 1 is a functional block schematic diagram of a TRIAC-based dimmer circuit.

In FIG. 1, a TRIAC-based dimmer circuit 10 is shown. The TRIAC-based dimmer circuit 10 includes an AC power source 12, a TRIAC module 14, a bridge 16, a DC-to-DC converter 18 and a solid-state load (SSL) circuit 20. The TRIAC module 14 receives a power signal from the AC power source 12. The TRIAC module 14 may include an input module 22 with a control input and one or more TRIAC(s) 24. The control input may be adjusted to adjust a dimming level of the SSL circuit 20.

The bridge 16 rectifies an AC output voltage received from the TRIAC module 14 to provide a first direct current (DC) voltage (e.g., 200-700 volts (V)) on a DC voltage bus 26. The DC-to-DC converter 18 converts the first DC voltage to a second DC voltage (e.g., voltage less than or equal to 30 V). The second DC voltage is provided to the SSL circuit 20.

The TRIAC-based dimmer circuit 10 may also include a bleeder resistance $R_1$, a switch $S_1$, and a control module 28. The bleeder resistance $R_1$ and the switch $S_1$ are connected in series between the DC voltage bus 26 and a ground reference 30. The bleeder resistance $R_1$ is provided to increase current out of the TRIAC module 14 during, for example, low dimming conditions (e.g., when current supplied to the SSL circuit 20 is less than a predetermined level). The SSL circuit 20 may detect the first DC voltage of the DC voltage bus 26 via a line 32. The control module 28 controls state of the switch $S_1$ based on the first DC voltage.

In operation, the first DC voltage (or bus voltage) across the bleeder resistance $R_1$ provides a bleed current from the DC voltage bus 26 to the ground reference 30 when the switch $S_1$ is closed. The bleed current is determined based on the first DC voltage and the bleeder resistance $R_1$. The bleeder resistance $R_1$ aids in maintaining a hold up current out of the TRIAC module 14. The control module 28 controls a state of the switch $S_1$ according to the current supplied to the SSL circuit 20. As an example, if the SSL circuit 20 is receiving a current level greater than or equal to a load current associated with drawing the hold up current from the TRIAC module 14, then the control module 28 transitions the switch $S_1$ to an OFF (or open) state. If the SSL circuit 20 is receiving a current level less than the load current associated with drawing the hold up current from the TRIAC module 14, then the control module 28 transitions the switch $S_1$ to an ON (or closed) state.

Bleed current loss is eliminated when the switch $S_1$ is turned OFF. This increases operating efficiency during high load conditions.

The TRIAC-based dimmer circuit 10 provides the bleed current from the DC voltage bus 26 to the ground reference 30 on a high-voltage (or primary) side of the DC-to-DC converter 18. The DC voltage bus 26 is a high voltage (e.g., 200-700 V) bus. For this reason, the switch $S_1$ is constructed to handle the high voltages and corresponding current levels experienced during operation.

Figure 2:
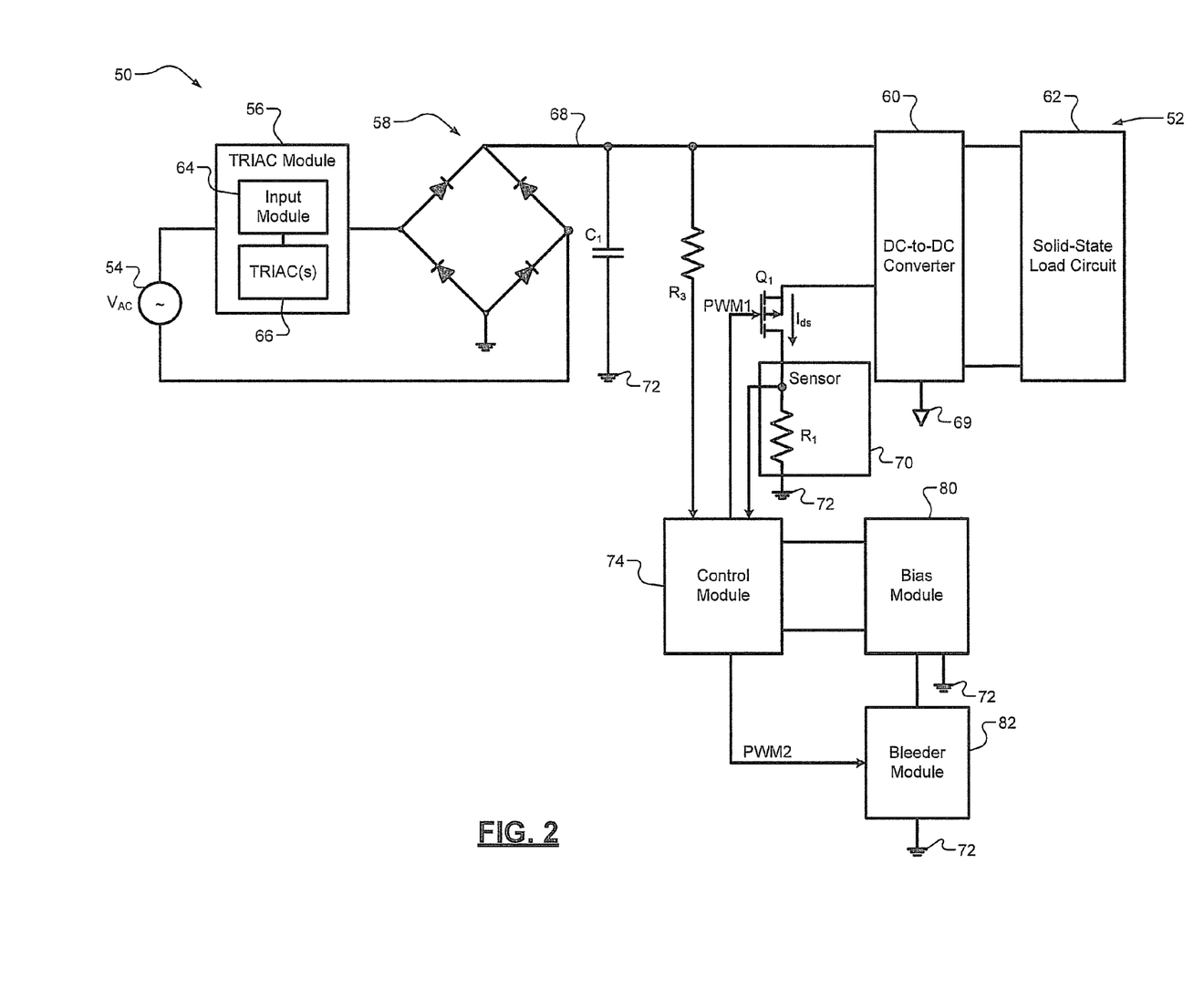
FIG. 2 is a functional block schematic diagram of a TRIAC dimming system in accordance with the present disclosure.

In FIG. 2, a TRIAC dimming system 50 is shown. The TRIAC dimming system 50 includes a power train 52, which includes an AC power source 54, a TRIAC module 56 (referred to as a TRIAC dimmer), a bridge 58, a DC-to-DC converter 60 and a SSL circuit 62. The TRIAC module 56 receives a power signal from the AC power source 54. The TRIAC module 56 may include an input module 64 with a control input and one or more TRIAC(s) 66 (referred to as a bidirectional switching circuit). The TRIAC(s) 66 may be configured for incandescent light and/or solid-state light operation and have corresponding latch up and hold up current levels. The control input may be provided via, for example, a variable resistor or other suitable component(s) to adjust turn ON time of the TRIAC(s) and as a result a dimming level of the SSL circuit 62.

Figure 3:
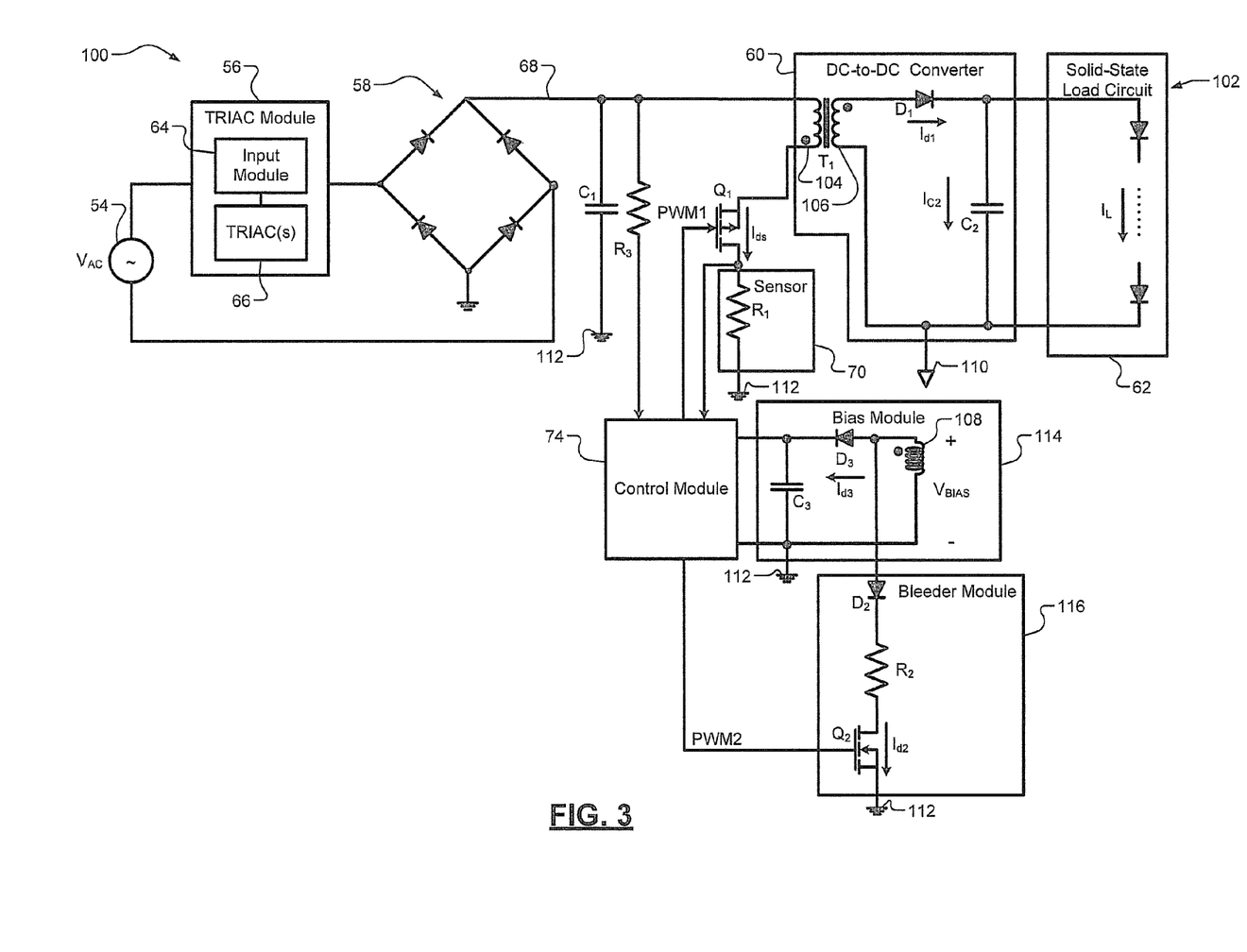
FIG. 3 is a functional block schematic diagram of another TRIAC dimming system illustrating elements of a bias module and a bleeder module in accordance with the present disclosure.
Figure 10:
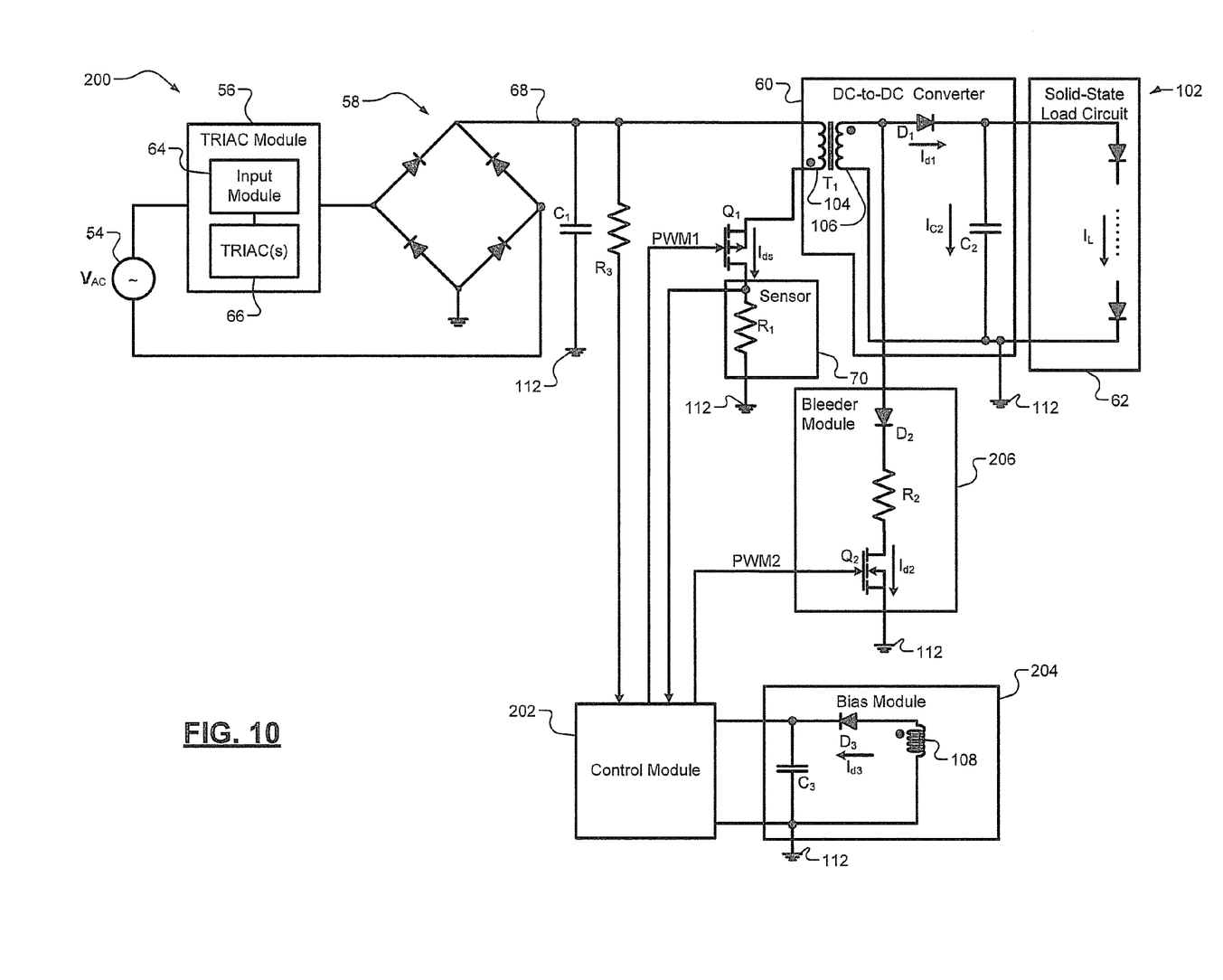
FIG. 10 is a functional block schematic diagram of another TRIAC dimming system with secondary side bleeder current operation in accordance with the present disclosure.
Figure 11:
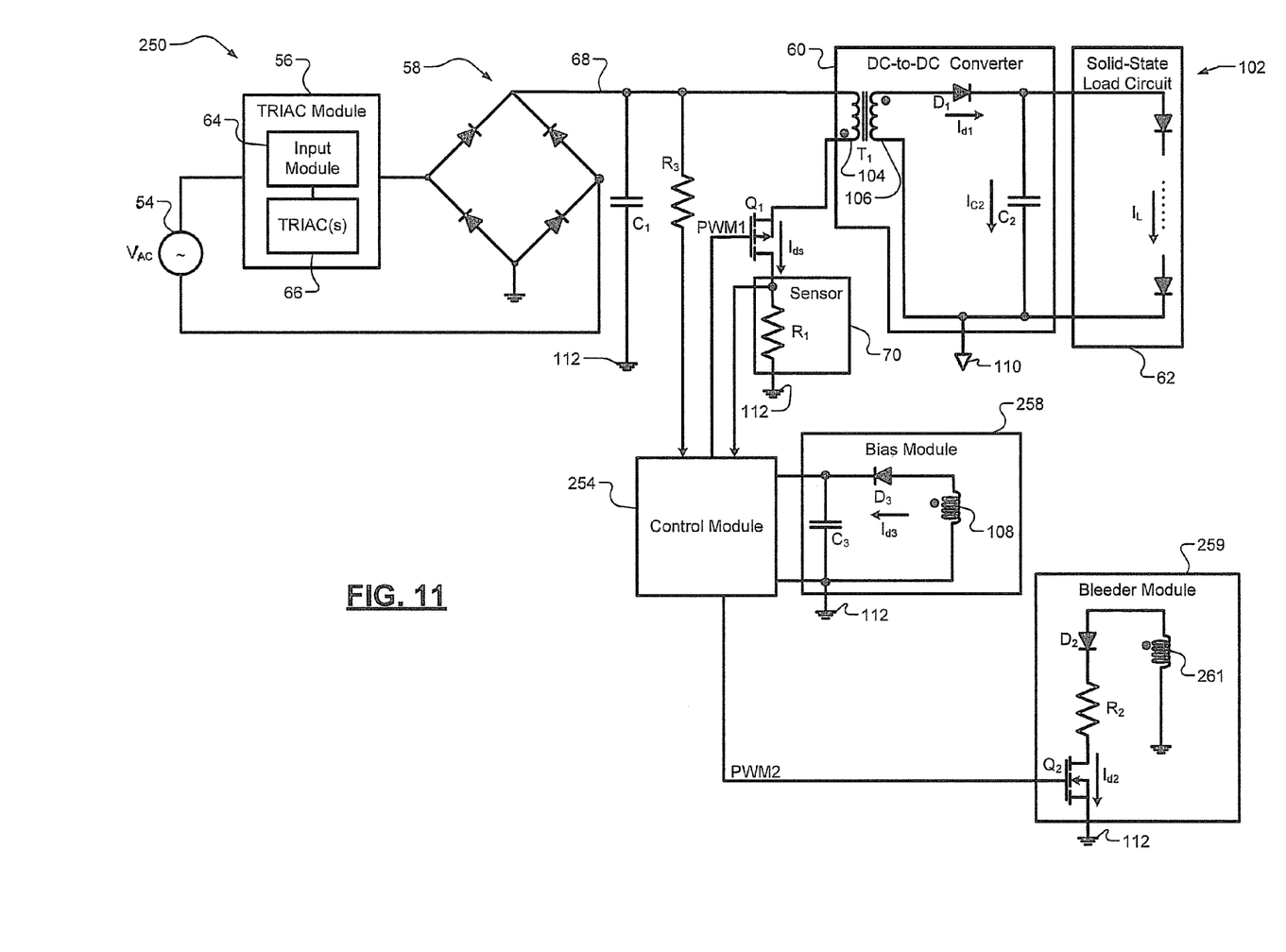
FIG. 11 is a functional block schematic diagram of another TRIAC dimming system incorporating separate bias and bleed coils in accordance with the present disclosure.

The bridge 58 rectifies an AC output voltage received from the TRIAC module 56 to provide a first DC voltage (e.g., 200-700 volts (V)) on a DC voltage bus 68. The DC-to-DC converter 60 is connected to a first ground reference 69 and converts the first DC voltage to a second DC voltage (e.g., voltage less than or equal to 30 V). The second DC voltage is provided to the SSL circuit 62. The DC-to-DC converter 60 may be in a flyback, boost, buck, buck-boost, or other suitable configuration. Examples of flyback configurations are shown in FIGS. 3, 10 and 11. The SSL circuit 62 may include, for example, one or more solid-state lamps, such as light emitting diodes (LEDs).

The TRIAC dimming system 50 may also include a first capacitance $C_1$, a first switch $Q_1$, and a sensor 70. The first capacitance $C_1$ is connected between the DC voltage bus 68 and a second ground reference 72. The first capacitance $C_1$ aids in maintaining the first DC voltage on the DC voltage bus 68. The second ground reference is different than the first ground reference 71. The second ground reference may be isolated from and have a different voltage potential than the first ground reference 71. The first switch $Q_1$ and the sensor 70 are connected in series between the DC-to-DC converter 60 and the second ground reference 72. The first switch $Q_1$ and the sensor 70 are connected on a primary (high-voltage) side of the DC-to-DC converter 60. The first switch $Q_1$ may be a metal-oxide-semiconductor field-effect transistor (MOSFET) and be controlled by a control module 74. The sensor 70 may be used to detect current through the first switch which may be converted to a current level of the SSL circuit 62 via the control module 74. The sensor 70 may include, for example, a first resistance $R_1$ or other suitable components for detecting voltage and/or current at a drain of the first switch $Q_1$. The first resistance $R_1$ may be connected in series with the first switch $Q_1$ and connected between the first switch $Q_1$ and the second ground reference 72.

The control module 74 generates a first control signal PWM1 to control operation of the first switch based on the first DC voltage, the voltage $V_{R1}$ across the first resistance $R_1$, the current $I_{ds}$ passing through the first resistance $R_1$, and/or the current $I_L$ passing through the SSL circuit 62. The first control signal PWM1 is provided to a control terminal of the first switch $Q_1$. The first control signal PWM1 is provided to control a current level and/or a duty cycle of current received by the primary winding 104 and as a result a current level and/or a duty cycle of current received by the SSL circuit 62. The control module 74 may be connected to the DC voltage bus 68 to detect the first DC voltage via a third resistance $R_3$. The third resistance $R_3$ is connected between the DC voltage bus 68 and the control module 74. The control module 74 may also be connected to a node between the first switch $Q_1$ and the first resistance $R_1$ to detect the voltage $V_{R1}$ across the first resistance $R_1$, and/or the current $I_{ds}$ passing through the first resistance $R_1$. The control module 74 may determine the current $I_L$ based on the first DC voltage, the voltage $V_{R1}$, and/or the current $I_{ds}$. The control module 74 may be programmable to provide different luminance, bleed current, and dimming level relationships.

The TRIAC dimming system 50 further includes a bias module 80 and a bleeder module 82. The bias module 80 operates as a power supply and supplies power to the control module 74. The bias module 80 may supply power to the control module 74 based on power received from the DC-to-DC converter 60. The bleeder module 82 diverts current from the bias module 80 to the second ground reference 72. The bleeder module 82 diverts current from the bias module 80 to the second ground reference 72 based on a second control signal PWM2 received from the control module 74. The control module 74 generates the second control signal PWM2 based on the voltage $V_{R1}$, the current $I_{ds}$, and/or the current $I_L$ passing through the SSL circuit 62. This increases current passing through the TRIAC module 56, which aids in maintaining a hold up current through the TRIAC module 56.

In FIG. 3, another TRIAC dimming system 100 is shown. The TRIAC dimming system 100 includes a power train 102, which includes the AC power source 54, the TRIAC module 56 including the input module 64 and the TRIAC(s) 66, the bridge 58, a DC-to-DC converter 60 and the SSL circuit 62. Although the DC-to-DC converter 60 is shown in a flyback configuration, the DC-to-DC converter 60 may be in a boost, buck, buck-boost or other suitable converter configuration. The DC-to-DC converter 60 includes a transformer $T_1$, first diode $D_1$, and a second capacitance $C_2$. The transformer $T_1$ includes a primary coil 104 on a primary side and a secondary coil 106 on a secondary side. The transformer $T_1$ may also include a bias coil 108, which receives secondary power from the primary coil 104.

The secondary coil 106, the first diode $D_1$ and the second capacitance $C_2$ operate as a power supply for the SSL circuit 62. The first diode $D_1$, the second capacitance $C_2$, and the SSL circuit 62 are connected on the secondary (or low-voltage) side of the transformer $T_1$. The first diode $D_1$ is connected in series with the bias coil 108 and prevents reverse current through the secondary coil 106. Current through the first diode $D_1$ is designated $I_{d1}$. The second capacitance $C_2$ is connected between an output of the first diode $D_1$ and a first ground reference 110 and is connected across the SSL circuit 62. The second capacitance $C_2$ is connected in parallel with the bias coil 108 and aids in maintaining a second DC voltage across the SSL circuit 62. Current through the second capacitance C2 is designated $I_{C2}$. The SSL circuit 62 may include, for example, LEDs connected in series between terminals of the second capacitance $C_2$. Load current through the SSL circuit 62 is designated $I_L$.

The TRIAC dimming system 100 also includes the first capacitance $C_1$, the first switch $Q_1$, the sensor 70 with the first resistance $R_1$, and the control module 74. The first capacitance $C_1$ is connected between the DC voltage bus 68 and a second ground reference 112. The second ground reference 112 may be different than the first ground reference. The second ground reference 112 may be isolated from and have a different voltage potential than the first ground reference 110. The first switch $Q_1$ and the sensor 70 are connected in series between the primary coil 104 and the second ground reference 112. The first switch $Q_1$ and the sensor 70 are connected on a primary (high-voltage) side of the transformer $T_1$. The first switch $Q_1$ may be controlled by the control module 74 via the first control signal PWM1. The first resistance $R_1$ may be connected in series with the first switch $Q_1$ and between the first switch $Q_1$ and the second ground reference 112.

The TRIAC dimming system 100 further includes a bias module 114 and a bleeder module 116. The bias module 114 is on a load side (or low-voltage side) of the transformer $T_1$, as the bias module 114 receives power through the transformer $T_1$ and is not on the supply side (or high-voltage side) of the transformer $T_1$. The bleeder module 116 is also on the load side of the transformer $T_1$, as the bleeder module 116 receives current from the bias module 114. Although the bleeder module 116 is shown as being connected to and receiving current from the bias module 114, the bleeder module 116 may alternatively or additionally receive current from the secondary coil 106. An example of a bleeder module receiving current from a secondary coil of a transformer is shown in FIG. 10. The bleeder module 116 is connected on the load (or secondary side) of the transformer $T_1$ regardless of whether the bleeder module 116 receives current from the secondary coil 106, the bias coil 108, or both the secondary coil 106 and the bias coil 108.

The bias module 114 operates as a power supply and supplies power to the control module 74. The bias module 114 includes the bias coil 108, a third diode $D_3$ and a third capacitance $C_3$. The bias coil 108 receives power from the primary coil 104 and supplies current to the control module 74 while also supplying current to the bleeder module 116. The third diode $D_3$ prevents reverse current through the bias coil 108. The third capacitance $C_3$ aids in maintaining a bias voltage $V_{BIAS}$ (e.g., less than or equal to 30 V) across the bias coil 108, which is supplied to the control module 74. The control module 74 operates based on the bias voltage.

The bleeder module 116 diverts current from the bias coil 108 to the second ground reference 112. In the implementation shown, the bias module 114 and the bleeder module 116 share the bias coil 108, as such the bias coil 108 may be referred to as a bleed coil. The bleeder module 116 diverts current from the bias module 114 to the second ground reference 112 based on the second control signal PWM2 received from the control module 74. The control module 74 generates the second control signal PWM2 based on the voltage $V_{R1}$ across the first resistance $R_1$, the current $I_{ds}$ passing through the first resistance $R_1$, and/or the current $I_L$ passing through the SSL circuit 62.

The bleeder module 116 includes a second diode $D_2$, a second resistance (or bleeder resistance) $R_2$, and a second switch $Q_2$. The second diode $D_2$, the second resistance (or bleeder resistance) $R_2$, and the second switch $Q_2$ are connected in series between (i) the third diode $D_3$ and the bias coil 108, and (ii) the second ground reference 112. The second diode $D_2$ prevents reverse current through the bias coil 108. The bleeder resistance $R_2$ is used to bleed current from the transformer $T_1$ via the bias coil 108 to the second ground reference 112. The bleeder resistance R2 is optional and may be external to the control module 74 and/or an integrated circuit of the control module 74. The second switch $Q_2$ may be a MOSFET and is used to control the bleed current through the second resistance $R_2$ based on the second control signal PWM2.

Since the second switch $Q_2$ receives current from the bias module 114 and shares the same ground reference 112 as the control module 74, the switch $Q_2$ may be incorporated in the control module 74. The switch $Q_2$ may be controlled based on the current supplied to the SSL circuit 62, which is based on a dimming level of the TRIAC module 56. The dimming level of the TRIAC module 56 may be determined based on the first DC voltage of the DC voltage bus 68. The second switch $Q_2$ may be turned ON during deep dimming conditions, such as when a conduction angle of the TRIAC module 56 is low (less than a predetermined angle). A deep dimming condition may refer to a condition when a dimming level is less than a predetermined dimming level and/or when a luminous intensity output of the SSL circuit 62 is less than a predetermined luminous intensity output level. In order to effectively bleed power to hold up the TRIAC module 56, the bleed current $I_{d2}$ through the second diode $D_2$ and the second resistance $R_2$ may be as high as, for example, multiple amps (A). As a first example, the bleed current $I_{d2}$ may be provided when, for example, the current $I_L$ is less than the current $I_{ds}$. As another example, the bleed current $I_{d2}$ may be provided when, for example, the current $I_{D1}$ is less than the current $I_{ds}$.

The second switch $Q_2$ and/or the second resistance $R_2$ may be included in the control module 74 and/or an integrated circuit of the control module 74. The second resistance $R_2$ may be external and separate from the control module 74 and/or an integrated circuit of the control module 74 to allow thermal energy in the second resistance $R_2$ to be dissipated externally and away from the control module 74. This minimizes temperature of the control module 74.

Figure 4:
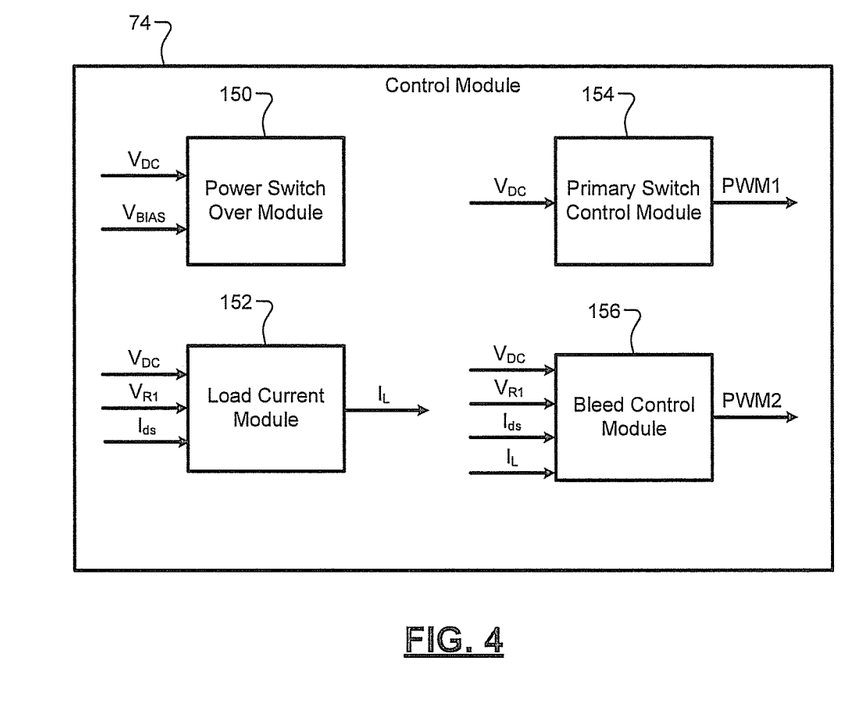
FIG. 4 is a functional block diagram of a control module in accordance with the present disclosure.

Referring also to FIG. 4, the control module 74 is shown. The control module 74 may include, for example, a power switch over module 150, a load current module 152, a primary switch control module 154, and a bleed control module 156. The power switch over module 150 controls whether the control module 74 receives power from the DC voltage bus 68 or from the bias module 114. During initial startup of the TRIAC dimming system 100, the first switch $Q_1$ is OFF. The control module 74 receives power including a first DC voltage $V_{DC}$ from the DC voltage bus 68. The control module 74 then generates the first control signal PWM1 to switch ON the first switch $Q_1$. The control module 74 may then receive power including a bias voltage $V_{BIAS}$ from the bias module 114. The power switch over module 150 switches power from the DC voltage bus 68 to the bias module 114 when the control module 74 is active. The control module 74 then operates based on power from the bias module 114 instead of power from the DC voltage bus 28. While operating based on power from the bias module 114, the control module 74 may monitor the first voltage of the DC voltage bus 68.

The load current module 152 determines the load current $I_L$ of the SSL circuit 62. The load current module 152 may indirectly determine the load current $I_L$ based on a detection and/or determination of the first DC voltage $V_{DC}$, the voltage $V_{R1}$, and/or the current $I_{DS}$. The first DC voltage $V_{DC}$, the voltage $V_{R1}$, and/or the current $I_{DS}$ may be directly and/or indirectly determined via, for example, the sensor 70 and the third resistance $R_3$. As an example, the load current $I_L$ may be determined based on equations 1-5, where: $I_{d3}$ is current supplied to the control module 74 from the bias coil 108; $V_L$ is the second DC voltage or voltage across the SSL circuit 62; $R_{TOTAL1}$ is a parallel combined resistance of the second capacitance $C_2$ and the SSL circuit 62; $R_L$ is the resistance of the SSL circuit 62; $N_S$ is a number of windings in the secondary coil 106; and $N_P$ is a number of windings in the primary coil 104. Impedance of the first diode $D_1$ may be negligible and/or ignored.

$$I_{DS} = I_{d1} + I_{d2} + I_{d3} \qquad (1)$$

$$I_{DS} = I_{C2} + I_L + I_{d2} + I_{d3} \qquad (2)$$

$$V_L = (I_{C2} + I_L) R_{TOTAL1} \qquad (3)$$

$$R_{TOTAL1} = R_L \parallel \frac{1}{j\omega C_2} \qquad (4)$$

$$V_L = \frac{V_{DC} \cdot N_s}{N_p} \qquad (5)$$

The primary switch control module 154 generates the first control signal PWM1 based on the first DC voltage $V_{DC}$. As an example, the first control signal PWM1 may be a pulse-width modulated signal. The frequency of the first control signal PWM1 when provided as a pulse-width modulated signal may be determined based on the first DC voltage $V_{DC}$. As another example, the first control signal PWM1 may be a constant (non-oscillating) voltage and/or current signal that is switched to either an ON state or an OFF state depending on the first DC voltage $V_{DC}$. If the first DC voltage $V_{DC}$ is greater than a predetermined voltage, the first control signal PWM1 may be switched to and remain in the ON state. If the first DC voltage $V_{DC}$ is less than or equal to the predetermined voltage, the first control signal PWM1 may be switched to and remain in the OFF state.

The bleed control module 156 controls the bleed current $I_{d2}$ drawn from the bias coil 108. The bleed control module 156 may set and/or adjust the bleed current $I_{d2}$ based on the first DC voltage $V_{DC}$, the voltage $V_{R1}$, the current $I_{DS}$, and/or the load current $I_L$ from the load current module 152. The bleed control module 156 may set and/or adjust the bleed current $I_{d2}$ based on characteristics of the TRIAC(s) 66. The characteristics of the TRIAC(s) 66 may include, for example, latch up and/or hold up current levels of the TRIAC(s) 66. The bleed current $I_{d2}$ may be adjusted to maintain the TRIAC(s) 66 in a latched or ON state. The bleed current $I_{d2}$ may be determined, for example, based on equations 1-7, where: $V_{BIAS}$ is the voltage across the bias coil 108; $N_{BIAS}$ is a number of windings in the bias coil 108; $R_{TOTAL2}$ is a parallel combined resistance of the third capacitance $C_3$, the resistance $R_2$, and an input resistance $R_{INPUT}$ of the control module 74. Impedances of the diodes $D_2$, $D_3$ and the second switch $Q_2$ may be negligible and/or ignored.

$$V_{BIAS} = \frac{V_P \cdot N_S}{N_{BIAS}} \qquad (6)$$

$$V_{BIAS} = (I_{d2} + I_{d3}) R_{TOTAL2} \qquad (7)$$

$$R_{TOTAL2} = R_2 \left\| \frac{1}{j\omega C_3} \right\| R_{INPUT} \qquad (8)$$

Figure 5:
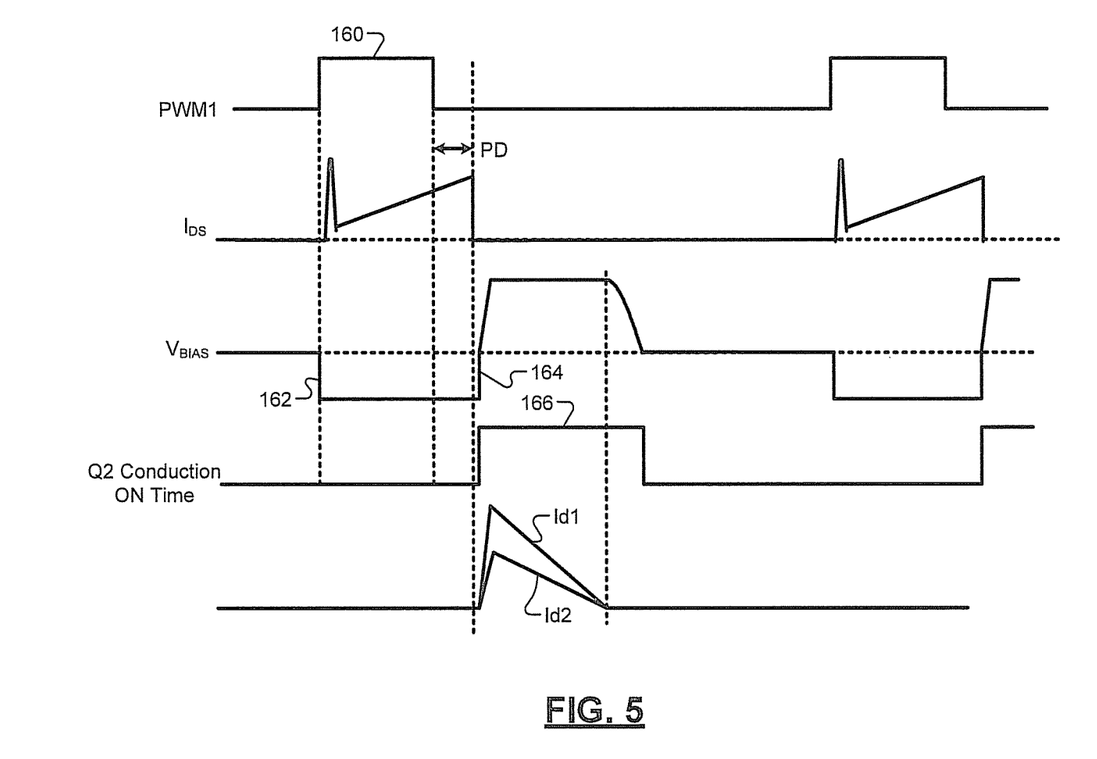
FIG. 5 is a signal diagram for the TRIAC dimming system of FIG. 3.

Referring now also to FIG. 5, a signal diagram for the TRIAC dimming system 100 is shown. The signal diagram includes examples of the first control signal PWM1, the current $I_{DS}$ through the first switch $Q_1$, the bias voltage $V_{BIAS}$, a conduction time of the second switch $Q_2$, the current $I_{d1}$ and the current $I_{d2}$. Although the first control signal PWM1 is shown as a pulse-width modulated signal, the first control signal PWM1 may be a constant (non-oscillating) voltage and/or current signal having corresponding ON and OFF states.

The current $I_{DS}$ through the primary coil 104 increases when the first control signal PWM1 is in an ON (or HIGH)

state, shown by pulse 160. The current $I_{DS}$ decreases a propagation delay PD after the first control signal PWM1 transitions to on OFF (or LOW) state. The bias voltage $V_{BIAS}$ transitions from a NULL or zero voltage state to a LOW state (designated at 162) when the current $I_{DS}$ is greater than, for example, zero. The bias voltage $V_{BIAS}$ transitions from the LOW state to a HIGH state (designated at 164) subsequent to the propagation delay PD. The conduction ON time of the second switch $Q_2$ (designated by pulse 166) may occur when the bias voltage $V_{BIAS}$ transitions from the LOW state to the HIGH state.

The first and second diode currents $I_{d1}$, $I_{d2}$ are shown for when a dimming level of the TRIAC module 56 is less than a predetermined threshold. If the dimming level is less than a predetermined threshold, bleed current $I_{d2}$ is increased and may follow the current $I_{d1}$, as shown. The bleed current $I_{d2}$ may be less than the current $I_{d1}$. Increasing the bleed current $I_{d2}$ allows the current through the primary coil 104 to be maintained above a predetermined level. This prevents the TRIAC(s) 66 from transitioning to an OFF state and allows the SSL circuit 62 to provide low levels of illumination during deep dimming conditions. The first and second diode currents $I_{d1}$, $I_{d2}$ may increase when the bias voltage $V_{BIAS}$ transitions to the HIGH state and the second switch $Q_2$ is in an ON state.

In the following FIGS. 6-9, various implementations are disclosed with respect to low-frequency and high-frequency bleeder switching. A TRIAC dimming system, such as one of the TRIAC dimming systems disclosed herein, may be operated in a selected one or more of these implementations.

Figure 6:
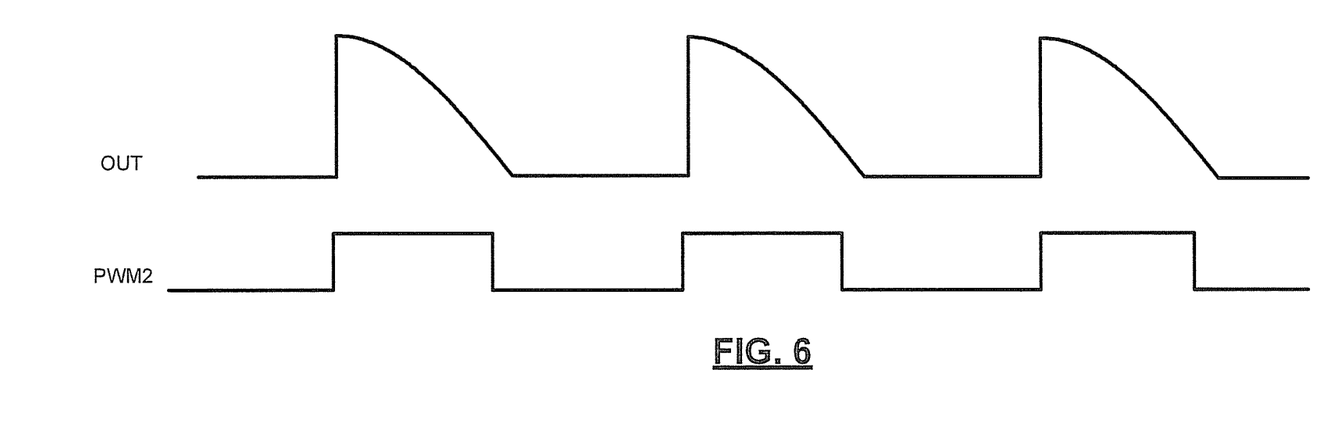
FIG. 6 is a signal diagram for the TRIAC dimming system of FIG. 3 operating in a leading edge mode with low-frequency bleeder switching.

In FIG. 6, a signal diagram for the TRIAC dimming system 100 of FIG. 3 operating in a leading edge mode with low-frequency bleeder switching is shown. The signal diagram includes a TRIAC output voltage signal OUT and the second control signal PWM2. The TRIAC output voltage signal OUT refers to an alternating current (AC) voltage at an output of the TRIAC(s) 66 or an AC voltage at a point between the TRIAC(s) and the bridge 58. The TRIAC output voltage signal OUT increases when the second control signal PWM2 transitions to a HIGH state and then gradually decreases while and subsequent to when the second control signal PWM2 is in the ON state.

Figure 7:
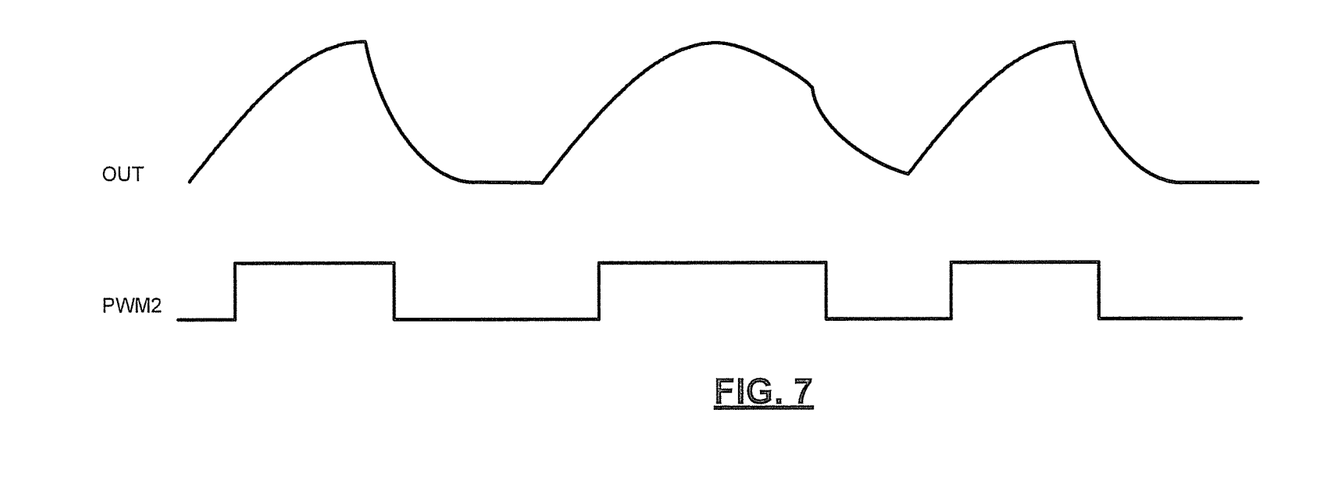
FIG. 7 is a signal diagram for the TRIAC dimming system of FIG. 3 operating in a trailing edge mode with low-frequency bleeder switching.

In FIG. 7, a signal diagram for the TRIAC dimming system 100 of FIG. 3 operating in a trailing edge mode with low-frequency bleeder switching is shown. The signal diagram includes a TRIAC output voltage signal OUT and the second control signal PWM2. The TRIAC output voltage signal OUT refers to an AC voltage at an output of the TRIAC(s) 66 or an AC voltage at a point between the TRIAC(s) and the bridge 58. The TRIAC output voltage signal OUT gradually increases prior to when the second control signal PWM2 transitions to a HIGH state, gradually increases to a maximum while the second control signal PWM2 is in the HIGH state, and then decreases while and subsequent to when the second control signal PWM2 is in the ON state. Increase and decrease rates of the TRIAC output voltage signal OUT depend upon the duty cycle or amount of time the second control signal is in the ON state. The TRIAC output voltage signal OUT remains in a LOW state for a predetermined period of time subsequent to when the second control signal PWM2 is transitioned to a LOW state.

Figure 8:
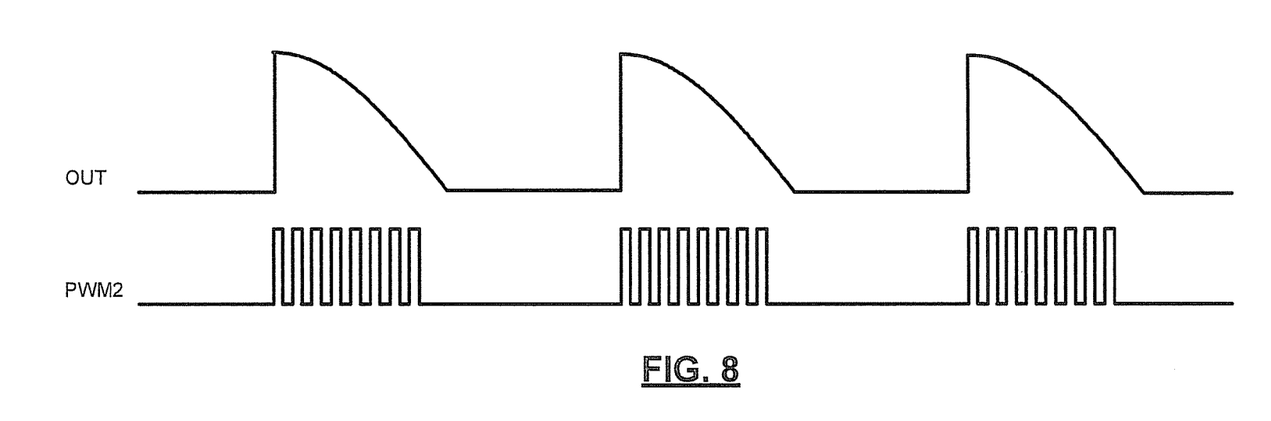
FIG. 8 is a signal diagram for the TRIAC dimming system of FIG. 3 operating in a leading edge mode with high-frequency bleeder switching.
Figure 9:
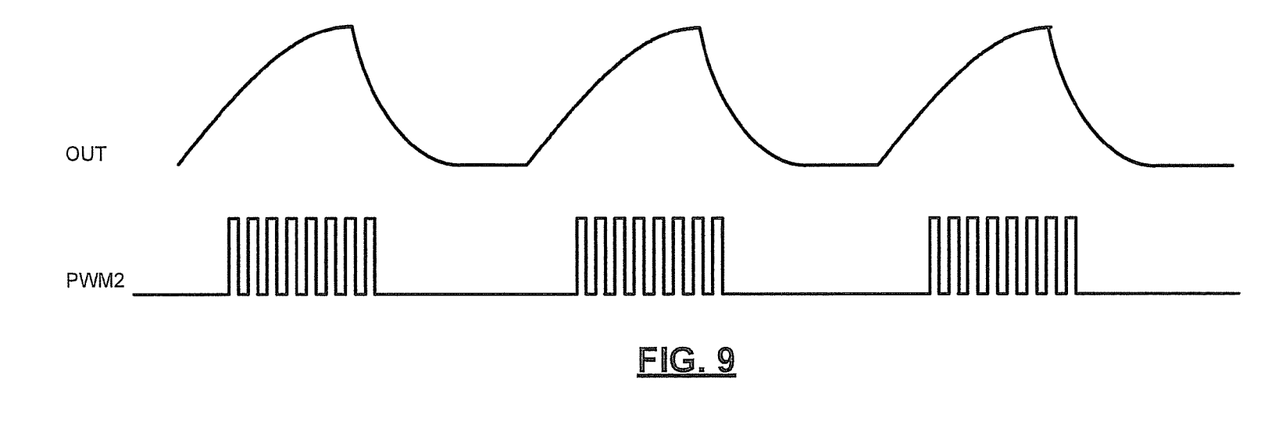
FIG. 9 is a signal diagram for the TRIAC dimming system of FIG. 3 operating in a trailing edge mode with high-frequency bleeder switching.

TRIAC output voltages may increase when the second control signal PWM2 transitions to and remains in an ON state for a period of time, as shown in FIGS. 6 and 7 or may increase when the second control signal PWM2 transitions between OFF and ON states at a high frequency (a frequency greater than a predetermined frequency), as shown in FIGS. 8 and 9.

In FIG. 8, a signal diagram for the TRIAC dimming system of FIG. 3 operating in a leading edge mode with high-frequency bleeder switching is shown. The signal diagram includes a TRIAC output voltage signal OUT and the second control signal PWM2. The TRIAC output voltage signal OUT refers to an AC voltage at an output of the TRIAC(s) 66 or an AC voltage at a point between the TRIAC(s) and the bridge 58. The TRIAC output voltage signal OUT increases when the second control signal PWM2 transitions to a HIGH state and then gradually decreases while and subsequent to when the second control signal PWM2 continues to be transitioned between OFF and ON states at a high frequency.

In FIG. 9, a signal diagram for the TRIAC dimming system of FIG. 3 operating in a trailing edge mode with high-frequency bleeder switching is shown. The signal diagram includes a TRIAC output voltage signal OUT and the second control signal PWM2. The TRIAC output voltage signal OUT refers to an AC voltage at an output of the TRIAC(s) 66 or an AC voltage at a point between the TRIAC(s) and the bridge 58. The TRIAC output voltage signal OUT gradually increases prior to when the second control signal PWM2 transitions to a HIGH state, gradually increases to a maximum while the second control signal PWM2 continues to be transitioned between OFF and ON states at a high frequency, and then decreases while and subsequent to when the second control signal PWM2 is transitioning between the OFF and ON states at a high frequency. The TRIAC output voltage signal OUT remains in a LOW state for a predetermined period of time when the second control signal PWM2 is transitioning between the OFF and ON states at a high frequency.

In FIG. 10, a TRIAC dimming system 200 with secondary side bleeder current operation is shown. The TRIAC dimming system 200 includes the power train 102 with the AC power source 54, the TRIAC module 56 including the input module 64 and the TRIAC(s) 66, the bridge 58, a DC-to-DC converter 60 and the SSL circuit 62. Although the DC-to-DC converter 60 is shown in a flyback configuration, the DC-to-DC converter 60 may be in a boost, buck, buck-boost or other suitable converter configuration. The DC-to-DC converter 60 includes the transformer $T_1$, the first diode $D_1$, and the second capacitance $C_2$. The transformer $T_1$ includes the primary coil 104 and the secondary coil 106. The transformer $T_1$ may also include the bias coil 108, which receives secondary power from the primary coil 104. Current through the first diode $D_1$ is designated $I_{d1}$. Current through the second capacitance C2 is designated $I_{c2}$. Load current through the SSL circuit 62 is designated $I_L$.

The TRIAC dimming system 200 also includes the first capacitance $C_1$, the first switch $Q_1$, the sensor 70 with the first resistance $R_1$, and the control module 74. The first capacitance $C_1$ is connected between the DC voltage bus 68 and a ground reference 112. The first switch $Q_1$ and the sensor 70 are connected in series between the primary coil 104 and the ground reference 112. The first switch $Q_1$ may be controlled by a control module 202 via the first control signal PWM1. The control module 202 may include the modules of and operate similar to the control module 74, but may be configured to control bleed current drawn from the secondary coil 106 instead of the bias coil 108.

The TRIAC dimming system 200 further includes a bias module 204 and a bleeder module 206. The bias module 204 is on a load side (or low-voltage side) of the transformer $T_1$, as the bias module 204 receives power through the transformer $T_1$ and is not on the supply side (or high-voltage side) of the transformer $T_1$. The bleeder module 206 is also on the load side of the transformer $T_1$, as the bleeder module 206 receives current from the secondary coil 106.

The bias module 204 operates as a power supply and supplies power to the control module 202. The bias module 204 includes the bias coil 108, the third diode $D_3$ and the third capacitance $C_3$. The bias coil 108 receives power from the primary coil 104 and supplies current to the control module 202 while supplying current to the bleeder module 206. The third diode $D_3$ prevents reverse current through the bias coil 108. The third capacitance $C_3$ aids in maintaining a bias voltage $V_{BIAS}$ across the bias coil 108, which is supplied to the control module 202. The control module 202 operates based on the bias voltage $V_{BIAS}$.

The bleeder module 206 diverts current from the secondary coil 106 to the ground reference 112. The bleeder module 206 diverts current from the secondary coil 106 to the ground reference 112 based on the second control signal PWM2 received from the control module 202. The control module 202 generates the second control signal PWM2 based on the voltage $V_{R1}$ across the first resistance $R_1$, the current $I_{ds}$ passing through the first resistance $R_1$, and/or the current $I_L$ passing through the SSL circuit 62.

The bleeder module 206 includes the second diode $D_2$, the second resistance (or bleeder resistance) $R_2$, and the second switch $Q_2$. The second diode $D_2$, the second resistance (or bleeder resistance) $R_2$, and the second switch $Q_2$ are connected in series between (i) an output of the secondary coil 106 and the first diode $D_1$, and (ii) the ground reference 112. The second diode $D_2$ prevents reverse current through the secondary coil 106. The bleeder resistance $R_2$ is used to bleed current from the transformer $T_1$ via the secondary coil 106 to the ground reference 112. In the implementation of FIG. 10, the secondary coil 106 is shared by the DC-to-DC converter 60 and the bleeder module 206, as such the secondary coil 106 may be referred to as a bleed coil. The second switch $Q_2$ is used to control the bleed current through the second resistance $R_2$ based on the second control signal PWM2.

The second switch $Q_2$ may receive current from the secondary coil 106 and not share the same ground reference as the control module 74. The second switch $Q_2$, the DC-to-DC converter 60 and the SSL circuit 62 may be connected to a different ground reference (e.g., the ground reference 110 of FIG. 3) than the control module 202. If the second switch $Q_2$ is connected to a difference ground reference, then the second switch $Q_2$ may be isolated from the control module 202 via an optocoupler. The optocoupler may be connected between the control module 202 and a control input of the second switch $Q_2$. The optocoupler 210 may receive a second control signal PWM2 and generate a third control signal PWM3. The second control signal PWM2 may be generated based on the current supplied to the SSL circuit 62, which is based on a dimming level of the TRIAC module 56. The dimming level of the TRIAC module 56 may be determined based on the first DC voltage of the DC voltage bus 68.

The second switch $Q_2$ may be turned ON during deep dimming conditions, such as when a conduction angle of the TRIAC module 56 is low (less than a predetermined angle). In order to effectively bleed power to hold up the TRIAC module 56, the bleed current $I_{d2}$ through the second diode $D_2$ and the second resistance $R_2$ may be as high as, for example, multiple amps (A). As a first example, the bleed current $I_{d2}$ may be provided when, for example, the current $I_L$ is less than the current $I_{ds}$. As another example, the bleed current $I_{d2}$ may be provided when, for example, the current is less than the current $I_{ds}$.

In FIG. 11, a TRIAC dimming system 250 with separate bias and bleed coils is shown. The TRIAC dimming system 250 includes the power train 102, which includes the AC power source 54, the TRIAC module 56 including the input module 64 and the TRIAC(s) 66, the bridge 58, a DC-to-DC converter 60 and the SSL circuit 62. Although the DC-to-DC converter 60 is shown in a flyback configuration, the DC-to-DC converter 60 may be in a boost, buck, buck-boost or other suitable converter configuration. The DC-to-DC converter 60 includes the transformer $T_1$, the first diode $D_1$, and the second capacitance $C_2$. The transformer $T_1$ includes the primary coil 104 and the secondary coil 106. The transformer $T_1$ may also include the bias coil 108 and a bleed coil, which receive secondary power from the primary coil 104. Current through the first diode $D_1$ is designated $I_{d1}$. Current through the second capacitance $C_2$ is designated $I_{c2}$. Load current through the SSL circuit 62 is designated $I_L$.

The TRIAC dimming system 250 also includes the first capacitance $C_1$, the first switch $Q_1$, the sensor 70 with the first resistance $R_1$, and a control module 254. The control module 254 may include the modules of and operate similar to the control module 74, but may be configured to account for the separate bias and bleed coils and corresponding bias and bleeder modules. The first capacitance $C_1$ is connected between the DC voltage bus 68 and a second ground reference 112. The second ground reference 112 may be different, isolated from, and at a different voltage potential than the first ground reference 110. The first switch $Q_1$ and the sensor 70 are connected in series between the primary coil 104 and the second ground reference 112. The first switch $Q_1$ may be controlled by the control module 74 via the first control signal PWM1.

The TRIAC dimming system 250 further includes a bias module 258 and a bleeder module 259. The bias module 258 is on a load side (or low-voltage side) of the transformer $T_1$, as the bias module 258 receives power through the transformer $T_1$ via the bias coil 108, which is not on the supply side (or high-voltage side) of the transformer $T_1$. The bleeder module 259 is also on the load side of the transformer $T_1$ and receives current through the transformer $T_1$ via a bleed coil 261. Although the bleeder module 259 is shown as receiving current from the primary winding 104 via the bleeder coil 261, the bleeder module 259 may receive current from the secondary coil 106. An example of a bleeder module receiving current from a secondary coil of a transformer is shown in FIG. 10.

The bias module 258 operates as a power supply and supplies power to the control module 254. The bias module 258 includes the bias coil 108, the third diode $D_3$ and the third capacitance $C_3$. The bias coil 108 receives power from the primary coil 104 and supplies current to the control module 254.

The third diode $D_3$ prevents reverse current through the bias coil 108. The third capacitance $C_3$ aids in maintaining a bias voltage across the bias coil 108, which is supplied to the control module 254. The control module 254 operates based on the bias voltage $V_{BIAS}$.

The bleeder module 259 diverts current from the secondary coil 106 and the bleed coil 261 to the second ground reference 112. The bleeder module 259 diverts current from the bias module 258 to the second ground reference 112 based on the second control signal PWM2 received from the control module 74. The control module 74 generates the second control signal PWM2 based on the voltage $V_{R1}$ across the first resistance $R_1$, the current $I_{ds}$ passing through the first resistance $R_1$, and/or the current $I_L$ passing through the SSL circuit 62. The bleeder module 259 includes the bleed coil 261, the second diode $D_2$, the second resistance (or bleed resistance) $R_2$, and the second switch $Q_2$. The bleed coil 261 is separate from the bias coil 108 and is connected in parallel with the second diode $D_2$, the second resistance $R_2$, and the second switch $Q_2$. The second diode $D_2$, the second resistance $R_2$, and the second switch $Q_2$ are connected in series between (i) the bleed coil 261, and (ii) the second ground reference 112.

The bleed coil 261 may be incorporated to increase a voltage provided to the bleeder module 116 and/or to decrease current in the bias coil 108. The bleed coil 261 may also be provided to prevent a voltage collapse at the bias coil 108. In the implementation of FIG. 10, if a sum of the current consumed by the control module 202 and the bleed current is greater than a predetermined current, then a voltage collapse may occur. By incorporating the bleed coil 261, a voltage collapse is prevented, as the control module 254 receives current from the bias coil 108 and the bleeder module 259 receives current from the bleed coil 261.

Figure 12:
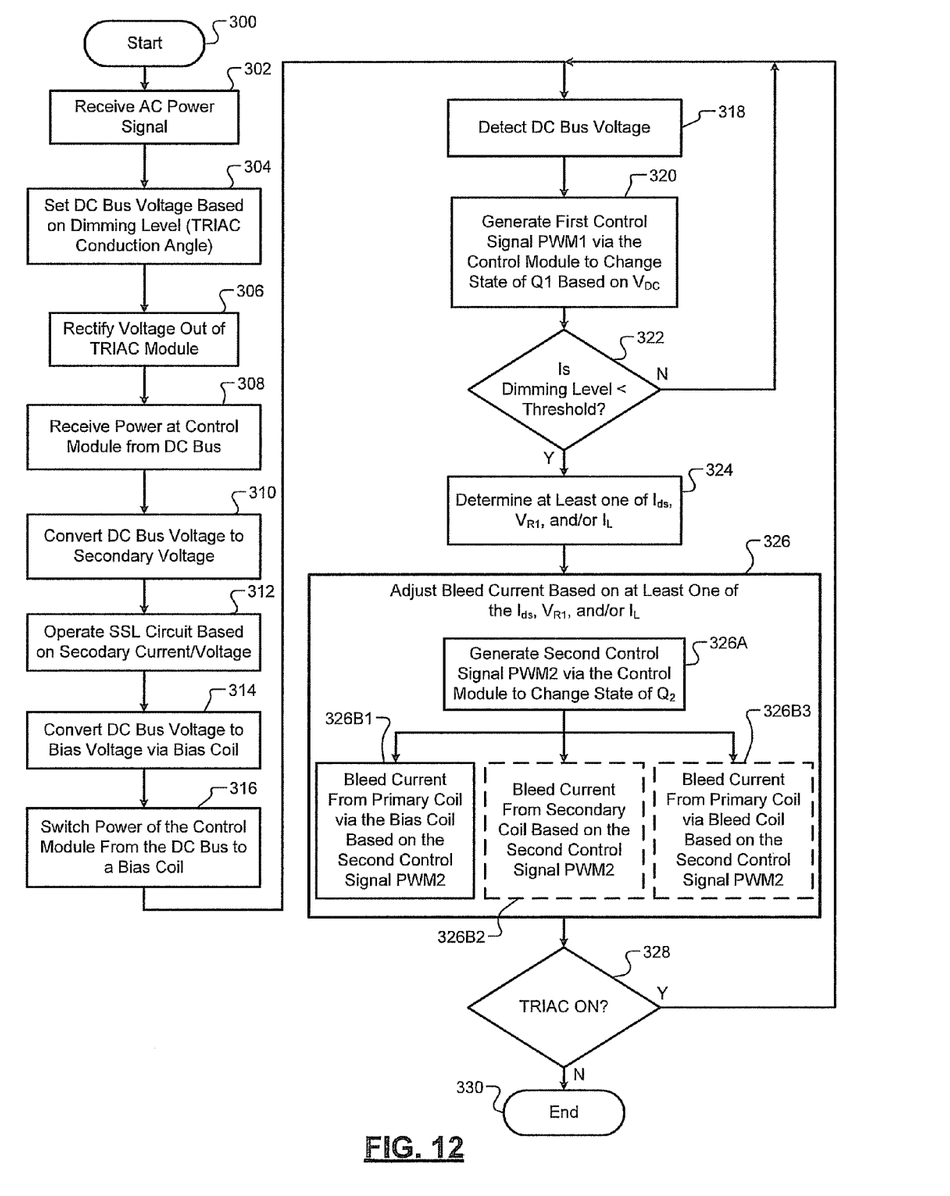
FIG. 12 illustrates a method of operating a TRIAC dimming system in accordance with the present disclosure.

The TRIAC dimming systems disclosed herein may be operated using numerous methods, an example method is provided by the method of FIG. 12. In FIG. 12, a method of operating a TRIAC dimming system is shown. Although the following tasks are primarily described with respect to the implementations of FIGS. 2-4 and 10-11, the tasks may be easily modified to apply to other implementations of the present disclosure. The tasks may be iteratively performed. The method may begin at 300.

At 302, an AC power signal is received from a power source (e.g., the power source 54) at a TRIAC module. At 304, the TRIAC module sets a DC bus voltage $V_{DC}$ (e.g., voltage on DC bus 68) based a dimming level or TRIAC conduction angle of the TRIAC module. The dimming level may be adjusted, as described above. At 306, a bridge (e.g., the bridge 58) rectifies an output signal received from the TRIAC module to generate the DC bus voltage $V_{DC}$.

At 308, a control module (e.g., one of the control modules 74, 202, 254) receives power from the DC bus. At 310, a transformer (e.g., the transformer $T_1$) converts the DC bus voltage $V_{DC}$ to a secondary voltage via primary and secondary coils.

At 312, the control module generates the first control signal PWM1 based on the power including current and voltage received from the DC bus to transition a first switch (e.g., the first switch $Q_1$) to an ON state. The control module transitions the first switch and the first control signal PWM1 to the ON state and/or adjusts a frequency of the first control signal PWM1 based on the DC bus voltage $V_{DC}$. This provides current to the secondary coil, which provides current to a SSL circuit (e.g., the SSL circuit 62). The SSL circuit is operated based on the current and/or voltage provide via the secondary coil.

At 314, the DC bus voltage $V_{DC}$ may be converted to a bias voltage via a bias coil (e.g., the bias coil 108). The bias voltage is provided to the control module. At 316, a power switch over module (e.g., the power switch over module 150) switches over power for the control module from the DC bus to the bias coil. The control module then receives and operates based on power received from the bias coil instead of power received from the DC bus.

At 318, the control module may detect the DC bus voltage $V_{DC}$ via a resistance (e.g., the third resistance $R_3$) connected to the DC bus. At 320, the control module generates the first control signal PWM1 to change the state and/or frequency of the first switch based on the DC bus voltage $V_{DC}$ and/or the dimming level. The dimming level is directly related to the DC bus voltage $V_{DC}$. The control module may determine the dimming level based on the DC bus voltage $V_{DC}$. The control module may change the state and/or frequency of the first switch based on conduction level requirements of lamps or LEDs of the SSL circuit.

At 322, the control module determines whether the dimming level is less than a predetermined threshold. The dimming level may be determined based on the DC bus voltage $V_{DC}$. If the dimming level is less than the predetermined threshold, task 324 may be performed, otherwise task 318 may be performed.

At 324, the control module determines at least one of current passing through the primary coil (e.g., the current $I_{ds}$), voltage across a first resistance or detected by a sensor (e.g., the first resistance $R_1$ and the sensor 70), end/ora load current (e.g., the current $I_L$). The control module may determine the current passing through the primary coil based on the dimming level, which is directly related to the voltage across the first resistance (e.g., the voltage $V_{R1}$).

At 326, the control module adjusts bleed current based on at least one of the primary coil, voltage across the first resistance or detected by the sensor, and/or the load current. At 326A, the control module generates a second control signal (e.g., the control signal PWM2) to change state of a second switch (e.g., the second switch $Q_2$). At 326B1, current is bled from the primary coil via the bias coil based on the second control signal (e.g., PWM2). The control module adjusts the bleed current as drawn from the bias coil. Task 326B1 is associated with the implementation of FIG. 3. At 326B2, current is bled from the secondary coil based on the second control signal. The control module adjusts the bleed current as drawn from the secondary coil. Task 326B2 is associated with the implementation of FIG. 10. At 326B3, current is bled from the primary coil via a bleed coil (e.g., the bleed coil 261) based on the second control signal. The control module adjusts the bleed current as drawn from the bleed coil. Task 326B3 is associated with the implementation of FIG. 11.

At 328, the control module may determine whether TRIAC (s) of the TRIAC module are in an ON state. This may be determined based on the DC bus voltage $V_{DC}$. If the TRIAC (s) are ON, task 318 may be performed, otherwise the method may end at 330.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-disclosed implementations provide bleeder modules with low-voltage operation. Current is bled on the load side under deep dimming conditions. This current is reflected from the load side or secondary side of a transformer back to the primary side of the transformer, which maintains TRIAC(s) of a TRIAC dimmer in an ON state. As a result, a TRIAC dimmer for SSL applications is maintained in a state of conduction under deep dimming conditions. The TRIAC diming systems disclosed herein are compatible with existing TRIAC dimmers and aid in maintaining TRIACs of the TRIAC dimmers in an ON state during deep dimming conditions. Since the TRIAC dimming systems disclosed herein aid in maintaining a TRIAC(s) in ON states during deep dimming conditions, the TRIAC dimming systems may be implemented in SSL applications where TRIAC dimmers currently exist. For example, the TRIAC dimming systems may be implemented in a circuit of a lamp that has solid-state LEDs. The lamp may then be plugged into a circuit that has a TRIAC dimmer. The TRIAC dimming system may then be used to maintain TRIAC(s) in the TRIAC dimmer in an ON state.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

In the following description, various terms are used to describe the physical relationship between components. When a first element is referred to as being "on", "engaged to", "connected to", or "coupled to" a second element, the first element may be directly on, engaged, connected, disposed, applied, or coupled to the second element, or intervening elements may be present. In contrast, when an element is referred to as being "directly on", "directly engaged to", "directly connected to", or "directly coupled to" another element, there may be no intervening elements present. Other words used to describe the relationship between elements should be interpreted in a like fashion (e.g., "between" versus "directly between", "adjacent" versus "directly adjacent", etc.).

Although the terms first, second, third, etc. may be used herein to describe various voltages, currents, coils, resistances, capacitances, signals, elements, and/or components, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example implementations.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
a transformer comprising
a first coil configured to receive a first voltage based on an output of a switching circuit,
a second coil configured to generate a first current based on the first voltage to power a solid-state load, and
a third coil configured to generate a second voltage based on the first voltage; and
a first switch configured to bleed, to a ground reference based on a dimming level, (i) a portion of the first current out of the second coil to divert the portion of the first current from being supplied to the solid-state load, or (ii) a portion of a second current out of the third coil.

2. The system of claim 1, further comprising a first module configured to generate a first control signal to change a state of the first switch based on the dimming level of the system.

3. The system of claim 2, further comprising an input module configured to receive an input and set the dimming level based on the input that is used to control a state of the first control signal.

4. The system of claim 2, wherein the first module is configured to generate the first control signal based on the first voltage.

5. The system of claim 2, further comprising a second switch configured to adjust current flowing through the first coil,
wherein the first module is configured to generate a second control signal to change a state of the second switch based on the current flowing through the first coil.

6. The system of claim 2, further comprising a second module comprising:
the third coil;
a diode in series with the third coil; and
a capacitance connected in parallel with the third coil,
wherein the third coil, the diode and the capacitance are configured to power the first module.

7. The system of claim 2, wherein:
the first module comprises a second module;
the second module is configured to switch power received by the first module from a direct current bus to the third coil; and
the direct current bus is at the first voltage.

8. The system of claim 2, wherein the first module is configured to:
determine whether the dimming level is less than a predetermined threshold; and
change the state of the first switch to an ON state when the dimming level is less than the predetermined threshold.

9. The system of claim 2, wherein:
the first control signal is a pulse-width modulated signal; and
the first module adjusts frequency of the first control signal based on the dimming level.

10. The system of claim 2, wherein the first module is configured to:
determine a load current of the solid-state load based on the first voltage or a current passing through the first coil; and
generate the first control signal based on the load current.

11. The system of claim 1, wherein the switching circuit comprises a triode for alternating current.

12. The system of claim 1, wherein the first switch is configured to bleed current from the second coil to the ground reference.

13. The system of claim 1, wherein the first switch is configured to bleed current from the third coil to the ground reference.

14. The system of claim 2, wherein the third coil supplies current to the first module.

15. A system comprising:
a transformer comprising
a first coil configured to receive a first voltage based on an output of a switching circuit,
a second coil configured to, based on the first voltage, generate a first current to power a solid-state load, and
a third coil configured to generate a second voltage based on the first voltage;
a first switch configured to, based on a dimming level, bleed current from one of the second coil and the third coil to a ground reference;
a first module configured to, based on the dimming level of the system, generate a first control signal to change a state of the first switch; and
a second module, wherein the second module comprises
a diode configured to receive the bleed current from one of the second coil and the third coil,
a resistance connected in series with the diode and configured to receive the bleed current from the diode, and
the first switch is connected in series with the resistance.

16. The system of claim 15, wherein the diode is configured to receive the bleed current from the second coil.

17. A system comprising:
a transformer comprising
a first coil configured to receive a first voltage based on an output of a switching circuit,
a second coil configured to, based on the first voltage, generate a first current to power a solid-state load, and
a third coil configured to generate a second voltage based on the first voltage;
a first switch configured to, based on a dimming level, bleed current from one of the second coil and the third coil to a ground reference;
a first module configured to, based on the dimming level of the system, generate a first control signal to change a state of the first switch; and
a second module, wherein the second module comprises
a diode configured to receive the bleed current from the third coil,
the third coil receives the bleed current from the first coil, and
the first switch, causes the bleed current to be bled from the third coil to the ground reference.

18. A system comprising:
a transformer comprising
a first coil configured to receive a first voltage based on an output of a switching circuit,
a second coil configured to, based on the first voltage, generate a first current to power a solid-state load, and
a third coil configured to generate a second voltage based on the first voltage;
a first switch configured to, based on a dimming level, bleed current from one of the second coil and the third coil to a ground reference; and
a first module configured to, based on the dimming level of the system, generate a first control signal to change a state of the first switch,
wherein
the first module receives power via a fourth coil, and
the fourth coil receives power from the first coil.

19. A method comprising:
receiving a first voltage at a first coil of a transformer based on an output of a switching circuit;
generating a first current via a second coil based on the first voltage to power a solid-state load;
generating a second voltage via a third coil based on the first voltage; and
bleeding, to a ground reference via a first switch based on a dimming level, (i) a portion of the first current out of the second coil to divert the portion of the first current from being supplied to the solid-state load, or (ii) a portion of a second current out of the third coil.

20. The method of claim 19, further comprising:
determining whether the dimming level is less than a predetermined threshold; and
changing the state of the first switch to an ON state when the dimming level is less than the predetermined threshold.

21. A method comprising:
receiving a first voltage at a first coil of a transformer based on an output of a switching circuit;
based on the first voltage, generating a first current via a second coil to power a solid-state load;
generating a second voltage via a third coil based on the first voltage;
based on a dimming level, bleeding current from one of the second coil and the third coil to a ground reference via a first switch;
based on the dimming level, generating a first control signal to change a state of the first switch;
determining a load current of the solid-state load based on the first voltage or a current passing through the first coil;
generating the first control signal based on the load current;
adjusting current flowing through the first coil based on a state of a second switch; and
generating a second control signal to change the state of the second switch based on the current flowing through the first coil.

* * * * *